(12) United States Patent
Schoela et al.

(10) Patent No.: US 6,726,970 B2
(45) Date of Patent: Apr. 27, 2004

(54) SELF-REINFORCED MOLDABLE POLY (METH)ACRYLATE SHEET

(75) Inventors: Egbert Schoela, Muellendorf (AT); Gerald Molnar, Gramatsneusiedl (AT); Robert Schwenninger, Deutsch Wagram (AT)

(73) Assignee: Roehm GmbH & Co. KG, Darmstadt (DE)

( * ) Notice: Subject to any disclaimer, the term of this patent is extended or adjusted under 35 U.S.C. 154(b) by 117 days.

(21) Appl. No.: 09/926,248

(22) PCT Filed: Jan. 17, 2001

(86) PCT No.: PCT/EP01/00487

§ 371 (c)(1), (2), (4) Date: Oct. 1, 2001

(87) PCT Pub. No.: WO01/56784

PCT Pub. Date: Aug. 9, 2001

(65) Prior Publication Data

US 2003/0012903 A1 Jan. 16, 2003

(30) Foreign Application Priority Data

Feb. 3, 2000 (DE) .......................................... 100 04 449

(51) Int. Cl.⁷ ................................................. B32B 1/02

(52) U.S. Cl. ....................................... 428/35.7; 428/520

(58) Field of Search ................................. 428/35.7, 520

(56) References Cited

U.S. PATENT DOCUMENTS 4,581,259 A * 4/1986 Rambaud ..................... 427/350
5,851,606 A * 12/1998 Visser .......................... 428/15

FOREIGN PATENT DOCUMENTS

| DE | 43 13 925 | 11/1994 |
| DE | 197 14 399 | 10/1998 |
| DE | 198 14 266 | 10/1999 |

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

Self-reinforced, thermoplastically moldable sheets made from poly(meth)acrylate having at least two layers which differ in their filler content. The ratio between the elongation at break of the layer with higher filler content and the elongation at break of the layer with lower filler content is less than 1.5. The poly(meth)acrylate sheets can serve as a semifinished product for producing sanitary items, such as bathtubs, shower trays or washbasins, preferably by thermoforming, without the need for any other reinforcing layers sprayed on or otherwise applied after molding.

29 Claims, No Drawings

SELF-REINFORCED MOLDABLE POLY (METH)ACRYLATE SHEET

This application is a 35 USC 371 filing of PCT/EP01/00487, filed Jan. 17, 2001 in German.

The present invention relates to thermoplastically mouldable, self-reinforced sheets made from poly(meth) acrylate, processes for producing poly(meth)acrylate sheets of this type, and sanitary items, such as bathtubs, shower trays or washbasins, which may be produced from these semifinished sheets.

The present invention relates in particular to self-reinforced, thermoplastically mouldable sheets made from poly(meth)acrylate and having at least two layers which differ in their filler content, where the filler content is the percentage proportion by weight of the reinforcing fillers, based on the total weight of the respective layer.

These polyacrylate sheets serve in particular for the production of sanitary items, such as bathtubs, shower trays or sink basins.

In principle, sanitary items are manufactured by a multistage production process having at least four stages. Acrylic sheeting is first produced, and this is then thermoformed. Since the moulding has insufficient mechanical strength, a reinforcement layer has to be applied, by spraying a glass fibre/styrene mixture onto the reverse side of the moulding. A sheet of timber is often inserted to reinforce the base region here, and this, too, is secured by spray-application of resin material comprising glass fibre.

After reinforcement, protruding glass fibres are rolled into the backing. After these operations, the resultant sanitary item has to be annealed in order to polymerize the reinforcement layer.

Disadvantages of this process are the various manpower-intensive operations and the undesirable emissions of solvent during any type of backing-application process, and also the handling of glass fibre, which is a major risk per se. Finally, the processing of various plastic components and of the mixture of materials comprising reinforcing materials and plastics gives the sanitary items poor recyclability.

The process of WO 98/45375=PCT/EP98/01881 makes some progress in avoiding the disadvantages referred to. According to this publication, the reinforcement layer is composed of a cold-curing (meth)acrylate resin which has a content of from 1 to 75 percent by weight of fine fillers with particle size not above 100 μm. This permits a sanitary item which is completely recyclable and nevertheless complies with the mechanical properties required to be provided without use of any fibrous fillers, such as asbestos or chopped glass fibre. However, the application of the reinforcement layer by a spraying process is not entirely without problems, at least from the point of view of employee safety, particularly since there is a health risk to operators.

WO 97/46625=PCT/GB97/01523 (ICI) proposes reducing the risk to manpower and operators by using aqueous redox systems to cure the spray-applied (meth)acrylate system. Although this reduces the adverse effects of solvents (ethyl methyl ketone, other ketones and organic solvents and the like) during the spraying procedure this reduction is only slight, since the amount of curing agent to be used is vanishingly small in comparison with the binder component. Indeed, spraying itself is an operation not entirely free from risk. Mention should be made, for example, of the very fine dispersion, unavoidable during spraying, of comparatively volatile polymerizable constituents of the (meth)acrylate resin. The MAC values for MMA and other monomers are in fact relatively low and are much more rapidly achieved during spraying than, for example, during processing by other methods. It would be particularly desirable to be able to dispense with the subsequent spraying-on or application of a reinforcement layer.

In view of the prior art mentioned and discussed herein, an object of the invention was to provide sheets (semifinished products in the form of a sheet) made from poly(meth)acrylate, from which the sanitary items described in some detail above can be produced at the lowest possible production cost.

The provision of fully recyclable reinforced sheets made from poly(meth)acrylate ("acrylic sheeting") was likewise an object of the invention.

Another object was that the process for producing the semifinished sheet product, and also for producing the sanitary items, was to be attended by the lowest possible level of emissions (solvents, volatile and hazardous substances, such as monomers and the like).

The semifinished product should, furthermore, be capable of being produced and processed by conventional current industrial production processes.

A still further object of the invention is the provision of completely recyclable mouldings, preferably shower trays or washbasins, which are fully recyclable, as far as possible without any risk to operators, in particular using the depolymerization method known for acrylic sheeting, by means of metal baths.

Another object of the invention is to provide a semifinished product in the form of a sheet, the sanitary items produced from which, preferably shower trays or washbasins, meet the general requirements placed on the stability of sanitary items of precisely this type, while giving the highest possible materials-related savings.

The formation of cracks in the sanitary item, a particular risk during high-performance shaping of poly(meth)acrylate sheets (semifinished products), should also be suppressed to the greatest possible extent.

A still further object is the provision of a semifinished product in the form of a poly(meth)acrylate sheet with the best possible impact strength.

In addition, both the novel semifinished product and the novel sanitary item (moulding) which can be produced from the same are to be as simple as possible to manufacture.

The extent of downstream manual operations is moreover to be reduced to a minimum.

Finally, automation of the process for producing the mouldings from (self)reinforced poly(meth)acrylate sheets to the highest possible degree, and in a simple manner plays a not insignificant part.

Another point of particular interest is the provision of a sanitary item made from reinforced poly(meth)acrylate sheets which have high and/or improved values for one or a number a number, or all, of such mechanical parameters as abrasion resistance, flexural strength (measured on the inner side (upper side) of the moulded acrylic sheeting), flexural strength (measured on the reverse side (lower side)), modulus of elasticity, impact strength (measured on the inner or upper side of the moulded acrylic sheeting), impact strength (measured on the reverse side (corresponding to "coated side" in the prior art)).

A self-reinforced, thermoplastically mouldable poly (meth)acrylate sheet with all of the features of claim 1 achieves these objects together with other objects which can readily be inferred from the discussion of the prior art in the introduction or else rendered self-evident by the same, although they have not been specified in detail.

Advantageous embodiments of the semifinished product of the invention are provided by the claims dependent on the independent product claim.

With regard to a process, the features of the independent process claim solve the process aspects of the problem on which the invention is based. Advantageous versions of the process are protected by the process claims dependent on the independent process claim.

With respect to the sanitary item, the appropriate claim supplies the solution for this aspect of the problem on which the application is based, and advantageous embodiments are the subject-matter of the claims dependent on this product claim.

A sheet made from poly(meth)acrylate and having at least two layers which differ in their filler content, where the ratio between the elongation at break of the layer with higher filler content and the elongation at break of the layer with lower filler content is less than 1.5, can provide a poly(meth) acrylate sheet from which, for example by heat-assisted moulding processes known per se, sanitary items can be produced which give excellent compliance with all of the requirements placed by standards institutes and industrial processors on the physical properties of the sanitary item. In addition, there are many other advantages.

These include:

Full recyclability by the depolymerization method known per se, inter alia by avoiding the use of polyesters of asbestos fibres or glass fibres (freedom from polyester resin, freedom from asbestos, freedom from glass fibre).

No requirement for application of a backing during manufacture, i.e. for the application of a reinforcement layer after moulding the sanitary item, and resultant further automation of the production process.

Excellent compliance with mechanical properties (shaping capability, impact strength, stiffness) to DIN EN 198, exceeding the levels required.

Excellent compliance with mechanical properties (impact strength) to DIN ISO 179, exceeding the levels required.

Excellent compliance with mechanical properties (flexural strength) to DIN ISO 178, exceeding the levels required.

Excellent compliance with mechanical properties (tensile bond strength) to DIN ISO 4624, exceeding the levels required.

High strength of the mouldings under stress and superior durability of the bond between the two layers of the poly(meth)acrylate sheet.

Commercially available machinery and systems can be used in producing the semifinished product (the poly (meth)acrylate sheet) and the sanitary item, and the use of expensive and specialized tooling can therefore very substantially be dispensed with.

The absence of solvent during production of the sanitary item from the poly(meth)acrylate sheet, i.e. from the semifinished product, minimizes the risk of stress cracking. Solvent-containing systems, as sometimes used when applying a backing to mouldings made from acrylic sheeting have a particular tendency towards stress cracking in the finished reinforcement layer in the DIN EN 198 temperature cycle test.

The use of certain fillers in the layer with higher filler content permits a marked improvement in the mechanical and physical properties of a sanitary item of the invention.

For the purposes of the present invention, self-reinforced poly(meth)acrylate sheets or self-reinforced sheets made from poly(meth)acrylate are sheets or semifinished products which have at least two layers which differ in their filler content.

The term sheets is intended to mean sheet-like structures which may be either round, angular or semicircular. The term "self-reinforced" is a combination of "reinforcement" and "self". "Reinforcement" here refers to the improvement in mechanical properties over a sheet which is comparable but does not have a layer with high filler content. One way in which it may be determined is via the modulus of elasticity to DIN 53 457. Any increase here in the modulus of elasticity is to be taken as reinforcement. The term "self" is intended to imply that there is no need to use any "reinforcement" after the moulding of the sheet to give a satisfactory item. Rather, "self-reinforced" sheets permit additional reinforcement to be dispensed with when moulding sanitary items suitable for day-to-day use.

According to the invention, the poly(meth)acrylate sheet has to comprise at least two layers which differ in their filler content. The filler content is the percentage proportion of reinforcing fillers based on the total weight of the respective layer (% by weight). Besides the reinforcing fillers it is possible to use essentially non-reinforcing fillers, such as colour pigments or other additives known per se. These, however, are not taken into account when determining the content of reinforcing fillers in order to establish the weight of reinforcing fillers, but only for establishing the total weight of the respective layer. The ratio between the filler content of the layer with higher filler content and the filler content of the layer with lower filler content is preferably more than 2, particularly preferably more than 4 and very particularly preferably more than 8 or 16, based on the weight of the fillers.

The filler content of the layer with lower filler content is generally in the range from 0 to below 20% by weight, based on the total weight of the layer, whereas the filler content of the layer with higher filler content is generally in the range from 20 to 80% by weight, based on the total weight of the layer with higher or high content of reinforcing fillers.

One particularly advantageous variant provides that the layer with lower filler content is entirely free from reinforcing fillers. This method is particularly successful in providing high-gloss surfaces, such as those desirable in sanitary-quality acrylic sheeting.

Fillers are solid additives whose structure and composition differ substantially from the poly(meth)acrylate matrix. These may be either inorganic or organic materials.

The nature, form and amount of the fillers present in the semifinished product in the form of a sheet may be varied over a wide range depending on the specific desired application. Fillers which may be used advantageously during production of the self-reinforcing semifinished product include talc, dolomite, naturally occurring adhesions of talc and dolomite, mica, quartz, chlorite, aluminium oxide, aluminium hydroxide, clays, silicon dioxide, silicates, carbonates, phosphates, sulphates, sulphides, oxides, metal oxides, powdered glass, glass beads, ceramics, kaolin, porcelain, crystobalite, feldspar, chalk, carbon and/or inert-gas-filled hollow microparticles.

Preference is in principle also given to silanized grades of fillers, since the adhesion to the matrix achievable by way of the silanization is better than that of non-silanized fillers.

Among the types of filler, those of particular interest are minerals comprising mica, chlorite, quartz, for example ®Plastorit grades from the company Naintsch, talc-dolomite adhesions, in particular white talc/pure dolomite adhesions, BC micrograces from Naintsch, ®DORSILIT crystalline quartz flour from the company Dorfner, ®SIL-CELL microcellular additive combinations from the company Stauss, St. Pölten, ™Scotchlite hollow glass microbeads from the company 3M, ™Dualite hollow polymer microbeads from the company Pierce & Stevens Corp., ®Extendospheres XOL Hollow Microspheres from The PQ Corporation and ®Apyral grades (aluminium hydroxides) from the company Nabaltec.

In relation to microparticles, use may be made of a wide variety of these. In principle, they are hollow particles which may be regular or irregular, but preferably globular or spherical, and having an inert gas in their cavity.

Hollow microbeads which may be used include in principle hollow microbeads made from a variety of materials, e.g. glass, metals, metal oxides, polymers or organic compounds.

For the invention it is preferable to use hollow microbeads made from plastic and composed of polymers, such as polystyrene, polyvinyl chloride, polyvinylidene chloride, polyvinyl acetate, polyacrylate, polyacrylonitrile, polybutadiene, polyethylene terephthalate; other preferred hollow microbeads are those made from copolymers or from terpolymers, based on the monomers which form the copolymers mentioned.

Examples of these polymers and copolymers which form the actual hollow beads are vinylidene chloride-acrylonitrile copolymer, polyvinylidene chloride, acrylonitrile-vinylidene chloride copolymer, acrylo-nitrile-methacrylonitrile copolymer, acrylonitrile-divinylbenzene-vinylidene chloride copolymer, and the like.

It is also preferred for the purposes of the invention to use a mixture of hollow microbeads.

The hollow microbeads or microparticles which can be used according to the invention may have been coated with coatings for adapting processing properties or for varying reinforcement properties.

Modifications of the simple hollow microbeads are also particularly suitable. For example, hollow microbeads which are of particular interest are those composed of polymers which have been covered (coated) with mineral substances in order to ensure better stability with respect to the influence of the surrounding medium.

The coating of the hollow microbeads may be composed of very fine-grain mineral substances, e.g. calcium carbonate, quartz, mica, aluminium hydroxide, crystobalite, or the like.

Particular preference is given to hollow microbeads which have been coated with calcium carbonate, in particular hollow microbeads made from plastic.

An example of an overview of the production of the hollow microbeads is found in Mat. Res. Soc. Symp. Proc. Vol. 372, 1995 Materials Research Society, in the contribution by David L. Wilcox, Sr. and Morris Berg, pp. 3 to 13, and in the literature cited therein.

Particularly suitable grades of gas-filled hollow microbeads made from plastic include ®Dualite grades, e.g. ®Dualite M 6032 (Pierce & Stevens Corp.); ®Expancel grades, e.g. ®Expancel 642 WU, ®Ropaque grades, e.g. ®Ropaque OP 62 (Rohm and Haas Co.), Matsumoto microspheres, e.g. Microsphere F-30E (Matsumoto Yushi Seiyaku Co. Ltd.), and the like.

The morphologies of the types of filler mentioned may differ. They may be spherical or non-spherical, but less preference is given to fillers having the shape of fibres or fragments. If the reinforcing fillers present have a lamellar or acicular shape, the resultant self-reinforcing semifinished products have particularly good combinations of properties.

If the fillers are globular, or in particular lamellar or acicular, they permit orientation of the particles along the direction of flow of the plastic material as it flows under the action of heat and/or pressure during moulding of the semifinished product to give sanitary items, for example by way of high-performance shaping processes, such as thermoforming. This orientation of the reinforcing filler particles, preferably parallel to the surface of the semifinished product in the form of a sheet, can give a balanced stiffness-impact strength ratio in the moulded sanitary item, and permits good surface quality of the sanitary item, and gives adequate flow line resistance, and can improve heat resistance, and generally exerts a favourable effect on the feel of the finished sanitary item.

In one particular embodiment of the resultant semifinished product of the invention, the filler particles used are laminar fillers. For the purposes of the invention, these are fillers which can assume a preferred orientation during flow (moulding of the thermoplastically mouldable semifinished product).

The size of the filler particles can also play a part in determining the quality of the semifinished product of the invention. For example, the stiffness of the semifinished product, and therefore of the resultant sanitary item, can be controlled by way of suitable dimensioning of the fillers. The grain size range generally used for the reinforcing fillers is from about 0.01 to about 100 $\mu$m. The average particle size of the filler used is advantageously in the range from 0.01 to 80 $\mu$m, in particular in the range from 0.05 to 30 $\mu$m, very particularly advantageously in the range from 0.1 to 20 $\mu$m.

The finer the reinforcing fillers used, the higher the stiffness and impact strength of the sanitary item. The resultant semifinished products become more brittle as the fillers become larger. According to the invention, particularly advantageous semifinished products are characterized in that the residue from the fillers used on screening at 20 $\mu$m is below two percent by weight.

In principle, any of the layers of the poly(meth)acrylate sheet of the invention may comprise reinforcing fillers, but, as specified above, the content must be different. The individual layers here may have identical or different fillers.

Use is preferably made of filler(s) inert under the conditions of depolymerization of the (meth)acrylates. It will be apparent that the fillers of the layer with lower filler content may differ from those of the layer with high filler content, and that therefore the nature and amount of the fillers are independent of each other within the boundaries given.

For the purposes of the invention, these fillers inert under the conditions of depolymerization of the (meth)acrylates are substances which do not prevent, or substantially adversely affect, the depolymerization of acrylate polymers. This property of the fillers permits simple recycling of the mouldings, such as bathtubs, which may be made from the poly(meth)acrylate sheets.

The thickness of the poly(meth)acrylate sheet and therefore of the individual layers depends, inter alia, on the application. On the one hand, thin poly(meth)acrylate sheets are semifinished products which are particularly easy to process, and they have cost advantages by way of materials-related savings, but on the other hand the stability of the sheet increases with thickness, and it is therefore not possible to give narrow limits for the thickness of the sheet, nor therefore on that of the individual layers. If the sheet encompasses two layers, the thickness of each of the two layers is in the range from 0.5 to 10 mm, preferably in the range from 1 to 7.5 mm.

A particular self-reinforced, thermoplastically mouldable sheet of the invention is characterized in that the thickness of the layer with lower filler content is in the range from 2 to 4 mm, in particular in the range from 2.5 to 3.5 mm, while the thickness of the layer with higher filler content is in the range from 3 to 8 mm, preferably from 4 to 6 mm.

The polyacrylate sheet of the invention has at least two layers with different filler content. This means that the polyacrylate sheet may also, for example, encompass three, four or five layers, which may have different flexibility, strength and surface properties.

In order that a poly(meth)acrylate sheet can be used in a manner known per se to obtain a bathtub by moulding processes, such as the heat-assisted moulding process also termed thermoforming, it is necessary according to the invention that the rheological properties of the sheet fulfil certain requirements.

Surprisingly, extensive experiments have shown that the ratio between the elongation at break of the layer with higher filler content and the elongation at break of the layer with lower filler content has to be less than 1.5, preferably less than 1, in order that a semifinished product (poly(meth)acrylate sheet) can be used to obtain shower trays or bathtubs by thermoforming. The ratio between the elongation at break of the layer with higher filler content and the elongation at break of the layer with lower filler content is preferably in the range from 0.8 to 0.1 and very particularly preferably in the range from 0.6 to 0.1. This elongation at break is determined to DIN EN ISO 527-2 (force transducer 1 kN, pretensioning force 0.05 MPa, velocity 50 mm/min, holding time with pretensioning force applied 12 min, test velocity 500 mm/min, test temperature 190° C., conditioning: 16 h, under standard conditions of temperature and humidity).

Elongation at break is a complex parameter dependent on a wide variety of factors. These include temperature, and also the test velocity at which this parameter is determined.

As mentioned, the ranges specified limit the elongations at break, i.e. the ratio between the elongations at break of the at least two layers. Although the effect of the fillers on this property cannot be described by any generally applicable formula, it is possible to adjust the elongation at break by using additives such as lubricants to increase flowability, or polymers with very high molecular weight to reduce the same. In addition, it is also possible to use experiments to determine the effect of the fillers on melt viscosity, and to adjust the elongation at break to a desired value by mixing fillers in a suitable ratio. The examples below may in particular serve as guidelines to the person skilled in the art.

The elongation at break of the layer with higher filler content is advantageously in the range from 50 to 450%, preferably in the range from 100 to 300% and very particularly preferably from 100 to 200%.

A layer with lower filler content preferably has an elongation at break in the range from 300 to 1500%, advantageously in the range from 600 to 1200% and particularly advantageously from 700 to 1100%.

The resultant self-reinforced poly(meth)acrylate sheets generally have elongations at break in the range from 150 to 900%, preferably in the range from 200 to 600% particularly advantageously in the range of 300% and above.

Examples of ways of obtaining the individual layers are extrusion and casting. Both of these processes are known from the literature (cf. Ullmann's Encyclopedia of Industrial Chemistry, Fifth Edition on CD ROM, 1998 edition, keyword "polymethacrylates").

One preferred embodiment of a layer with low filler content may be obtained by polymerizing a (meth)acrylate system which comprises:

| A) a) (meth)acrylate | 30–100% by wt. |
|---|---|
| a1) methyl (meth)acrylate | 0–99.99% by wt. |
| a2) $C_2$–$C_4$ (meth)acrylate | 0–99.99% by wt. |
| a3) $\geq C_5$ (meth)acrylate | 0–50% by wt. |
| a4) (meth)acrylates of functionality two or higher | 0.01–50% by wt. |
| a5) urethane (meth)acrylates | 0–50% by wt. |
| b) cornonomers | 0–70% by wt. |
| b1) vinylaromatics | 0–35% by wt. |
| b2) vinyl esters | 0–35% by wt., | where the selection of components a1) to a5) is such that they give from 30 to 100% by weight of a), and the selection of components b1) to b2) is such that they give from 0 to 70% by weight of b), while a) and b) together give 100 percent by weight of component A), B) for each part by weight of A), 0–12 parts by weight of a (pre)polymer soluble or swellable in A), C) initiator, the amount being sufficient to cure component A), D) where appropriate, means of adjusting the viscosity of the system, E) for each part by weight of A) an amount of up to 3 parts by weight of conventional additives and F) for each part by weight of the total of A) to E), below 0.25 part by weight of reinforcing fillers.

In contrast, a layer with high filler content may be obtained by polymerizing a (meth)acrylate system which comprises:

| A) a) (meth)acrylate | 50–100% by wt. |
|---|---|
| a1) methyl (meth)acrylate | 0–99.99% by wt. |
| a2) $C_2$–$C_4$ (meth)acrylate | 0–99.99% by wt. |
| a3) $\geq C_5$ (meth)acrylate | 0–50% by wt. |
| a4) (meth)acrylates of functionality two or higher | 0.01–50% by wt. |
| a5) urethane (meth)acrylates | 0–50% by wt. |
| b) comonomers | 0–50% by wt. |
| b1) vinylaromatics | 0–50% by wt. |
| b2) vinyl esters | 0–50% by wt., | where the selection of components a) and b) is such that together they give 100 percent by weight, while a1) to a5) together make up from 50 to 100% by weight, and b1) and b2) together make up from 0 to 50 percent by weight, of the polymerizable component A), B) for each part by weight of A), 0–12 parts by weight of a (pre)polymer soluble or swellable in A), C) initiator, the amount being sufficient to cure component A), D) where appropriate, means of adjusting the viscosity of the system, E) for each part by weight of binder (total of A) to E)), from 0.25 to 4 parts by weight of reinforcing fillers.

Component A) is an essential constituent of the (meth)acrylate system to be polymerized.

The use of any bracketed constituent is optional, i.e. (meth)acrylate is acrylate and/or methacrylate.

The monomer component A) comprises at least 30% by weight of (meth)acrylate for layers with lower filler content and at least 50% by weight of (meth)acrylate for layers of higher filler content, preference being given to monofunctional (meth)acrylates having a $C_1$–$C_4$ ester radical. Longer-chain esters, i.e. those having an ester radical whose chain has 5 or more carbon atoms, have been limited to 50% by weight in component A). Component A) preferably comprises at least 40 percent by weight of methyl methacrylate.

The stated amount of the long-chain (meth)acrylates makes the system more impact-resistant. These esters therefore make the semifinished product more flexible, and also softer, and there are therefore limitations on performance at amounts above 50% by weight.

Besides the (meth)acrylates, component A) may also comprise other comonomers, the proportion of these being limited to 70 or, respectively, 50% by weight. Among these comonomers, vinylaromatics and/or vinyl esters may be present in component A), in each case at up to 35 or, respectively, 50% by weight. Higher proportions of vinylaromatics are difficult to incorporate into the polymer and can lead to separation of the system. Higher proportions of vinyl esters may moreover give insufficiently thorough curing at low temperatures, and they tend to increase shrinkage.

Component A) preferably comprises from 80 to 100% by weight, particularly preferably from 90 to 100% by weight, of (meth)acrylates, since semifinished products produced using these monomers have desirable processing and performance characteristics for sanitary items. It is preferable for the proportion of $C_2$–$C_4$ esters in (meth)acrylates to have been limited to 50% by weight in component A), and the amount of these esters present in component A) is with preference not more than 30% by weight, and particularly advantageously not more than 20% by weight. This enables particularly flexible layers to be constructed.

Particularly suitable monofunctional (meth)acrylates are methyl methacrylate, butyl methacrylate, butyl acrylate, 2-ethylhexyl acrylate, ethyl triglycol methacrylate, hydroxypropyl methacrylate.

Particularly suitable comonomers are vinyltoluene, styrene, vinyl esters.

There is preferably a restriction to not more than 20% by weight of styrene in A), since higher content can lead to problems during polymerization.

(Meth)acrylates whose functionality is two or higher are also essential in component A) and are present in amounts of from 0.01 to 50% by weight. The (meth)acrylates whose functionality is two or higher have crosslinking action in the polymerization, contributing, inter alia, to reduction of water absorption of the semifinished product and thus of the final sanitary item. (Meth)acrylates whose functionality is two or higher are preferably present in the (meth)acrylate system of component A) in amounts of from 0.1 to 30% by weight, particularly advantageously in amounts of from 0.2 to 5% by weight. The (meth)acrylates whose functionality is two or higher serve to link linear polymer molecules. This can influence properties such as flexibility, scratch resistance, glass transition temperature, melting point or curing behaviour.

(Meth)acrylates whose functionality is two or higher and whose use is preferred include:

(1) Bifunctional (Meth)acrylates

Compounds of the general formula:

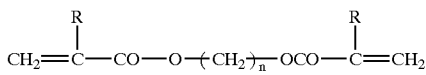

where R is hydrogen or methyl and n is a positive integer from 3 to 20, e.g. the di(meth)acrylate of propanediol, of butanediol, of hexanediol, of octanediol, of nonanediol, of decanediol or of eicosanediol; compounds of the general formula:

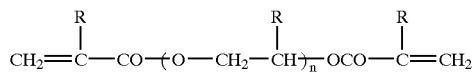

where R is hydrogen or methyl and n is a positive integer from 1 to 14, for example the di(meth)acrylate of ethylene glycol, of diethylene glycol, of triethylene glycol, of tetraethylene glycol, of dodecaethylene glycol, of tetradecaethylene glycol, of propylene glycol, of dipropylene glycol or of tetradecapropylene glycol; and glycerol di(meth)acrylate, 2,2'-bis[p-(γ-methacryloxy-β-hydroxypropoxy)phenylpropane] or bisGMA, bisphenol A dimethacrylate, neopentyl glycol di(meth)acrylate, 2,2'-di(4-methacryloxy-polyethoxyphenyl)propane having from 2 to 10 ethoxy groups per molecule and 1,2-bis(3-methacryloxy-2-hydroxypropoxy)butane.

(2) (Meth)acrylates of Functionality Three or Higher

Trimethylolpropane tri(meth)acrylates and pentaerythritol tetra(meth)acrylate.

The usual preferred (meth)acrylates whose functionality is two or higher encompass, among others, triethylene glycol dimethacrylate (TEDMA), trimethylolpropane trimethacrylate (TRIM), 1,4-butanediol dimethacrylate (1,4-BDMA), ethylene glycol dimethacrylate (EDMA).

Other preferred components of a (meth)acrylate system to be used according to the invention are urethane (meth)acrylates whose functionality is two or higher.

These are obtainable, for example, in a conventional and well known manner from isocyanate-containing prepolymers into which olefinic double bonds are introduced by means of hydroxyl-containing compounds, e.g. hydroxyethyl acrylate, hydroxyethyl methacrylate, allyl alcohol, vinyl alcohol, etc.

Very particularly advantageous layers are obtained using certain novel urethane (meth)acrylates. These have at least three reactive terminal ethylenically unsaturated functions derived from (meth)acrylates. They are obtainable by reacting hydroxyalkyl (meth)acrylates with polyisocyanates and with polyoxyalkylenes which have at least three hydroxyl functions, the proportion of polyethylene oxide being less than 50% by weight, based on the total amount of polyoxyalkylene.

The property profile in terms of elongation at break and ultimate tensile strength may be influenced as desired via selection of the proportion of polyisocyanates having 3 or more isocyanate groups. The higher the proportion of compounds of functionality three or above, the greater the ultimate tensile strength. However, there is a marked reduction in elongation at break.

Preference is given to compounds whose isocyanate groups have different reactivities. This property makes the conduct of the reaction easier, but no resultant limitation is intended. An example of a preferred polyisocyanate of this type is isophorone diisocyanate and the respective urethane (meth)acrylates which can be derived therefrom by appropriate reactions.

Particularly preferred urethane (meth)acrylates for the present invention have three or four reactive terminal ethylenically unsaturated functions.

The urethane (meth)acrylates preferred for the invention can be prepared by processes in which i) at least one hydroxyalkyl (meth)acrylate is reacted with ii) at least one polyisocyanate and with iii) at least one polyoxyalkylene.

There are various possible reactions here. For example, urethane (meth)acrylates for the present invention may be prepared in a two-stage synthesis in which, for example, equimolar amounts of hydroxyalkyl (meth)acrylate and polyisocyanate are reacted, and the resultant reaction product is then allowed to react with a suitable amount of polyoxyalkylene. Choice of suitable polyisocyanates or of suitable conduct of the reaction can then give, in particular, urethane (meth)acrylates having three reactive terminal ethylenically unsaturated functions.

It is also possible to carry out the reaction in one step. This gives a mixture of urethane (meth)acrylates with a varied number of ethylenically unsaturated functions. It has been found that when trifunctional polyoxyalkylenes are used the products are frequently tetrafunctional urethane (meth) acrylates with the connecting groups of the formula (A.V) which have been described above by way of example. The resultant mixtures may be used as additive in the (meth) acrylate resins, without further purification.

Component B) is an optional component, but is very preferably used.

There are in principle two different ways of preparing B). On the one hand, B) may be a polymeric substance which is mixed with A). On the other hand, A) may be prepolymerized, giving what is known as a syrup. This syrup itself then has monomeric constituents of group A) and polymeric constituents of group B), mixed with one another.

To adjust the viscosity of the resin, and the entire rheology of the system, and also for better thoroughness of curing, a polymer or prepolymer B) may—as stated—be added to component A). This (pre)polymer is to be soluble or swellable in A). For each part of A), use is made of from 0 to 12 parts of the prepolymer B). Poly(meth)acrylates are particularly suitable, and these may be used in the form of solid polymer dissolved in A) or as what are known as syrups, i.e. partially polymerized mixtures of appropriate monomers. Polyvinyl chloride, polyvinyl acetate, polystyrene, epoxy resins, epoxy (meth)acrylates, unsaturated polyesters, polyurethanes, and mixtures of these are also suitable. Examples of the effects of these polymers are specific flexibility properties, shrinkage control, stabilization or flow improvement.

For 1 part of A) it is preferable to use from 2 to 11 parts of B). It is particularly advantageous to use from 4 to 10 parts of B) for 1 part of A). It is very particularly preferable to take from 6 to 9 parts of a (pre)polymer and mix them with one part of polymerizable monomers A). It is preferable to dissolve the (pre)polymer B) in A).

In a preferred embodiment, the ratio by weight between components B) and A) of the binder is in the range from 1:1 to 12:1. An ideal balance of properties can be achieved within this range.

Particularly advantageous ratios B):A) by weight are in the range from 5:1 to 12:1.

Component B) ((pre)polymer) may be any desired polymer. It is particularly advantageously a suspension polymer, emulsion polymer and/or regrind. The average particle diameter of the (pre)polymers is then usually <0.8 mm.

The prepolymer B) is very advantageously a PMMA bead polymer obtainable by suspension polymerization. This polymer can permit the production of layers with properties including adequate impact strength of resultant mouldings.

The average particle diameter of the bead polymer here is from about 0.1 to 0.8 mm. From 0.2 to 0.8 mm is preferred, in particular from 0.4 to 0.8 mm.

The (pre)polymer B) is preferably a copolymer, and the hardness and flexibility of the reinforcement layers here can be influenced via the nature and amount of the comonomer in the (pre)polymer B). Comonomers which may be used and are part of the structure of the respective (pre)polymer B) include acrylates and methacrylates other than methyl methacrylate (MMA), vinyl esters, vinyl chloride, vinylidene chloride, styrene, α-methylstyrene and the various halogen-substituted styrenes, vinyl and isopropenyl ethers, dienes, such as 1,3-butadiene and divinylbenzene.

Examples of preferred comonomers for methyl acrylate are ethyl acrylate, butyl acrylate, 2-ethylhexyl acrylate, ethyl methacrylate, n-butyl methacrylate, isobutyl methacrylate, 2-ethylhexyl methacrylate, propyl acrylate, propyl methacrylate, methacrylic acid, ethyl triglycol methacrylate, hydroxypropyl methacrylate.

Component C) is an essential component indispensable for the curing (polymerization) of the polymerizable system.

The polymerization may take place by a free-radical or ionic route, free-radical polymerization being preferred. Heat, radiation and initiators may be used for the polymerization, preferably initiators which form free radicals. The conditions for each polymerization depend on the monomers selected and on the initiator system, and are well known to the person skilled in the art.

Preferred initiators include the azo initiators well known to the person skilled in the art, such as AIBN or 1,1-azobiscyclohexanecarbonitrile, and also peroxy compounds, such as methyl ethyl ketone peroxide, acetylacetone peroxide, ketone peroxide, methyl isobutyl ketone peroxide, cyclohexanone peroxide, dibenzoyl peroxide, tert-butylperoxy benzoate, tert-butylperoxy isopropyl carbonate, 2,5-bis(2-ethyl-hexanoylperoxy)-2,5-dimethylhexane, tert-butylperoxy 2-ethylhexanoate, tert-butylperoxy 3,5,5-trimethylhexanoate, 1,1-bis(tert-butylperoxy)cyclohexane, 1,1-bis(tert-butylperoxy)-3,3,5-trimethylcyclohexane, cumyl hydroperoxide, tert-butyl hydroperoxide, dicumyl peroxide, bis(4-tert-butylcyclohexyl) peroxy-dicarbonate, mixtures of two or more of the abovementioned compounds with one another, and also mixtures of the abovementioned compounds which can likewise form free radicals that have not been mentioned.

Redox systems may also be used, and systems phlegmatized in organic solvents or in aqueous solutions or in aqueous suspension are also known and may be used. A system of this type is obtainable with the trademark ®Cadox from the company Akzo.

It is also possible to use mixtures of two or more initiators with stepped half-life times. This method can give better control of the polymerization reaction, local irregularities can be avoided and a more uniform result is obtained. This method can also shorten the post-polymerization time (annealing of the semifinished product in heating cabinets).

The amount of component C) is variable within wide limits. It depends on the formulation of the monomers, on the nature and amount of the (pre)polymer, and also on the desired polymerization temperature and the desired molecular weight of the polymer to be prepared. For example, guideline values generated for molecular weights from 10 000 to 200 000 (weight-average molecular weight) are from $2 \times 10^{-5}$ to about $1 \times 10^{-4}$ mol of initiator per mol of polymerizable constituents of the monomer system. Depending on the molecular weight of the initiator compound(s) used, from about $1 \times 10^{-3}$ to $5 \times 10^{-5}$ parts by weight of component C) may be used per part by weight of component A).

Component D) is an optional constituent of the polymerizable (meth)acrylate system, but one which is preferably present in the system. Examples are emulsifiers. Preference is given to lecithins for example soya lecithin. The amount of the substances to be used may be varied over a wide range. It is preferable to use from 0.01 to 1 part by weight of D) for each part by weight of A). It is particularly advantageous to use from 0.1 to 0.2 part by weight of D) for each part by weight of A).

Component E) is optional. These are the usual additives known per se, and examples of additives have been listed above. E) especially includes those fillers not falling within F). The category therefore takes in non-reinforcing fillers, such as colour pigments, antistats, antioxidants, mould-release agents, flame retardants, lubricants, dyes, flow promoters, light stabilizers, organic phosphorus compounds, such as phosphites and phosphonates, pigments, agents with thixotropic action, UV stabilizers, weathering stabilizers and plasticizers.

These conventional additives are preferably of smaller particle size than the fillers of component F). The average particle size of the fillers used as E) is preferably in the range less than 10 µm, advantageously in the range less than 5 µm, particularly preferably less than 1 µm and very particularly preferably less than 0.01 µm. The ratio between the average particle sizes of the fillers E) and F) is advantageously in the range from 1:3 to 1:1000, preferably in the range from 1:5 to 1:100 and particularly preferably in the range from 1:10 to 1:50.

Component F is essential in the layer with high filler content, whereas the layer with low filler content does not have to have any fillers. This component moreover has been described in detail above.

It is clear from the above that the composition of the various layers can differ markedly in the nature, and also the proportions by weight, of the components A) to F) used. While the layer with low filler content should especially have excellent surface quality, in particular scratch resistance and resistance to hairline-cracking, the layer with high filler content serves mainly for reinforcement, and the components of the layers can therefore be optimized to the purpose of each layer.

The layer with higher filler content is advantageously obtained by a casting process. The procedure here may be
  a) to provide, a polymerizable, filled (meth)acrylate composition,
  b) to pour the composition provided into a prepared mould,
  c) to polymerize the composition in the mould at a temperature above room temperature to obtain a semi-finished product of sheet type, and
  d) to remove the semifinished product from the mould.

One particularly advantageous way of achieving depletion of the reinforcing fillers at the surface here, and also enrichment of the reinforcing fillers at the lower side of the sheet is to utilize the viscosity of the (meth)acrylate system to be polymerized to obtain the semifinished product. The semifinished product of the invention is preferably obtainable by polymerizing a (meth)acrylate system which prior to polymerization has a viscosity in the range from 0.02 to 0.1 Pa·s (from 20 to 100 cP), preferably from 0.03 to 0.08 Pa·s (from 30 to 80 cP), particularly preferably from 0.04 to 0.06 Pa·s (from 40 to 60 cP), very particularly advantageously about 0.05 Pa·s (50 cP). Use of the preferred viscosity range during polymerization of the sheet is particularly successful in achieving a high-gloss surface. However, at the same time it is possible to achieve uniform distribution of pigments or of other conventional fillers, where these are very much finer than the reinforcing fillers. The invention is therefore successful in combining colour and high-gloss surface with adequate self-reinforcing action in the sanitary item of the invention. In particular, the layer with higher filler content may therefore also have a graded distribution of the reinforcing fillers over the thickness of the layer.

There are various ways of adjusting the viscosity. A first advantageous variant of the process of the invention is characterized in that the viscosity of the polymerizable composition is regulated by varying the ratio by weight of (pre)polymer to polymerizable monomers in the composition.

As an alternative to this, or combined with this, it can also be advantageous to regulate the viscosity of the formulation by varying the proportion of viscosity-adjusting agents. These agents which adjust, i.e. regulate, viscosity are known per se to the person skilled in the art. They include ionic, nonionic and zwitterionic emulsifiers.

In particularly preferred modifications of the process according to the invention, the viscosity-adjusting agent used comprises an emulsifier, preferably one or more lecithins.

Other advantageous means or processes for influencing and/or adjusting the viscosity of the polymerizable composition encompass the following measures, inter alia:

The viscosity of the polymerization system may be varied by adding regulator.

It can be advantageous to control the viscosity of the polymerization system by way of the mixing ratio between (pre)polymer and monomeric, polymerizable constituents of the polymerization system.

The nature and amount of wetting additives used, such as the lecithin mentioned, or else ®Catafor or the like, can permit adjustment of the viscosity to the desired value.

The filler concentration per se affects the viscosity of the polymerization system, as does the nature of the filler or of the filler mixture (grain size, oil absorption value, surface treatment).

In addition, the viscosity of the polymerization system may be changed by conventional additives, such as agents with thixotropic action (such as ®Aerosil grades).

The polymerization temperature may also be used to influence the viscosity of the system.

Finally, the initiator concentration and the kinetics of the polymerization reaction can also exert an influence on the viscosity of the polymerization system and therefore on the degree of settling-out of the fillers.

The layer with lower filler content may, if desired, be obtained by casting or extrusion.

One way of obtaining the polyacrylate sheets of the invention is therefore to bond, in a suitable manner, at least one layer with higher filler content to a layer with lower filler content. The layers here may be bonded with adhesive or by fusion. These processes are known per se.

It is also possible to obtain the poly(meth)acrylate sheet of the invention by coextruding the layer with lower filler content and the layer with higher filler content.

Coextrusion is well known to the person skilled in the art.

However, the moulding compositions here must have properties known per se, in particular with regard to their rheology. There are therefore limits both on the molecular weight of the polymers and on the amount and nature of the filler used. Furthermore, extrusion has hitherto been advisable only for polymers which have not been crosslinked. However, the cost-effectiveness of this process is advantageous.

Another process for producing the sheets of the invention polymerizes the layer with low filler content onto the layer with high filler content, or polymerizes the layer with high filler content onto the layer with low filler content.

One way of carrying out this polymerization is with the aid of what is known as the cell-casting process, where one poly(meth)acrylate layer serves as a sheet delimiting the cell, and the second layer is obtained by casting and subsequent bulk polymerization on the first layer. It is therefore regarded as particularly advantageous that the layer with higher filler content used is a sheet which, in the cell-casting process, is laid onto a lower sheet of glass of the cell mould, and, to obtain a layer with lower filler content, a (meth)acrylate system is then poured into the cell, onto the inserted sheet with higher filler content, and polymerized onto the same by the cell-casting process.

In casting processes, such as the cell-casting process or the Rostero process, a (meth)acrylate system is poured into a mould and then polymerized.

The poly(meth)acrylate sheet of the invention may be used to obtain sanitary items, by way of forming processes known per se. These include drawing, stretch forming, stretching, pressure forming, thermoforming, vacuum forming, pultrusion. Preferred processes are those in which the sheet is moulded while in the plastoelastic state. An example of a particularly highly suitable process is the heat-assisted moulding technique also termed thermoforming.

For this, the poly(meth)acrylate sheet is firmly clamped at the edge of the mould, and then the moulding is shaped as desired by forces which form the heated, unsupported blank. The forces used for forming may be generated by, inter alia, vacuum or compressed air, or be mechanical forces, e.g. those generated by plug-assists or hold-down plates, and these may be used individually or in combination. During the moulding process, the wall thickness of the polyacrylate sheet decreases.

The poly(meth)acrylate sheet here is preferably heated to a temperature in the range from 140 to 210° C., particularly preferably from 170 to 190° C.

The moulding apparatuses therefore usually have a heating apparatus alongside the mould, to heat the sheet by infrared radiation or air, or by contact, for example, infrared heating being preferred, since this method heats the sheet uniformly.

The heated sheet is then drawn into the mould. This takes place with the aid of the abovementioned forces used for forming. In the vast majority of embodiments of heat-assisted moulding apparatuses, vacuum is used to remove air from the region between sheet and mould.

A distinction is also made between the positive and negative moulding processes. In the positive process, a precise reproduction is generated on the inner side of the moulding, since this side comes into contact with the mould.

In the process of the invention for producing the sanitary item it is therefore preferably for the layer with the higher filler content to be adjacent to the mould, moulding taking place by the positive process.

This shaping technique is known per se, and the person skilled in the art will find valuable information in Ullmann's Encyclopedia of Industrial Chemistry, Fifth Edition on CD ROM, 1998 edition, keyword "plastics processing" or in Kunststoff-Maschinen-Führer, Johannaber, 3rd edn. Hanser-Verlag, 1992, pp. 618 et seq.

EXAMPLES

1. Production of an Example of a Layer with Higher Reinforcing Filler Content (Example 1)

1.1. Mould Construction

Two sheets of Sekurit glass are used as mould. A PVC sealing bead is placed between the glass sheets of the mould. Clamps are then used to secure three sides of the sheets of glass. The width of the cell can be varied by using a variety of thicknesses of sealing bead. In the example, the clearance providing the thickness of the cell was about 5 mm. The fourth side is sealed after filling. The resultant sealed sheet system is stored horizontally and placed in a water bath.

1.2. Poly(meth)acrylate System for Filling the Mould 1.1

| No. | Parts by weight | Substance | Group | % or parts (pts.) by weight |
|---|---|---|---|---|
| 7) | 0.08 | Crosslinker[2]* | A) | 0.18% A) |
| 6) | 0.30 | Dimeric α-methylstyrene | A) | 0.67% A) |
| 1) | 49.205 | Prepolymer[3]*, corresponds to about 44.285 pts. of A) and 4.9205 pts. of B) | A) B) | 99.15% A) 0.02 pts. of B) for each pt. of A) |
| 10) | 0.025 | Azovaleronitrile | C) | |
| 5) | 0.3 | Soya lecithin[5]* | D) | |
| 4) | 1.5 | Colour paste[6]* | E) | |
| 8) | 0.05 | ® Tinuvin 770[7]* | E) | |
| 9) | 0.04 | ® Aerosol OT[4]* | E) | |
| 3) | 48.5 | BC-Micro[1]* | F) | 1 pt. of F) for each pt. of Σ A)–E) |

[1]*BC-Micro special extender from the company Naintsch, A-8045 Graz-Andritz, Austria is a white talc-pure dolomite adhesion, the composition of which by chemical analysis is 12% of $SiO_2$, 22% of MgO, 24% of CaO, giving 40% loss on ashing for 1 h at 1050° C. Dolomite content (Leco) is 85%. Screen analysis to DIN 66165 to 20 μm gives 2.0% residue.
[2]*Crosslinker is triethylene glycol dimethacrylate (TEDMA).
[3]*Prepolymer is an MMA-based syrup, methyl methacrylate being prepolymerized in a manner known per se to conversion of about 10% (90% by weight of residual monomer). The viscosity of the prepolymer was about 450 cp.
[4]*® Aerosol OT is a dioctyl sodium sulphosuccinate from the company Cyanamid and is used as release agent/mould-release agent.
[5]*Soya lecithin is a product from the company Stern Lecithin und Soja GmbH, and is used as wetting agent for the fillers used.
[6]*Colour paste indicates a mixture essentially of titanium dioxide, colour pigments and dioctyl phthalate (DOP). The mixture is used for pigmenting sheets of the invention.
[7]*® Tinuvin 770 is a light stabilizer from the company Ciba - Spezialitätenchemie GmbH and belongs to the HALS product group.

1.3. Filling and Polymerization in the Cell

The fillers and additives needed are dispersed into about one third of the prepolymer (1) needed. Before this, a dispersant is first metered in, and is followed by the additives needed, e.g. regulators, crosslinkers, heat stabilizers, etc., and also reinforcing fillers, in the amounts stated (7, 6, 5, 8, 2).

This solution is dispersed for at least 30 min. in a mixing vessel which can be cooled and evacuated.

The solution temperature here should not exceed 50° C. After dispersion, the mix is cooled to room temperature and diluted with the remaining amount of prepolymer and then the initiator 10) is stirred into the solution. This solution is then homogenized for a further 30 min. in vacuo. The mix described is poured into the mould; the filled mould is stored horizontally in a water bath at 62° C., and the contents are polymerized. The main polymerization achieves about 90% conversion. The sheets are post-polymerized in an annealing oven at 120° C. Once the sheets have been cooled, the upper sheet of glass is removed from the cell, and the semifinished product (poly(meth)acrylate sheet) is removed.

2. Production of an Example of a Layer with Lower Content of Reinforcing Fillers (Example 2)

2.1. Mould Construction

As in 1.1., except that the cell has a thickness clearance of about 3.2 mm.

2.2. Poly(meth)acrylate System for Filling Mould 2.1

| No. | Parts by weight | Substance | Group | % or parts (pts.) by weight |
|-----|-----------------|-----------|-------|------------------------------|
| 7) | 0.08 | Crosslinker[2]* | A) | 0.091% A) |
| 6) | 0.25 | Dimeric α-methylstyrene | A) | 0.285% A) |
| 1) | 97.035 | Prepolymer[3]*, corresponds to about 87.3315 pts. of A) and 9.7035 pts. of B) | A) B) | 99.624% A) 0.02 pts. of B) for each Pt. of A) |
| 10) | 0.045 | Azovaleronitrile | C) | |
| 4) | 2.5 | Colour paste[6]* | E) | |
| 8) | 0.05 | ® Tinuvin 770[7]* | E) | |
| 9) | 0.04 | ® Aerosol OT[4]* | E) | |

2.3. Filling and Polymerization in the Cell

The stated amounts of the additives (3–9) needed are dispersed into the prepolymer (1) and homogenized for 30 min. in vacuo.

The mix described is poured into the mould; the filled mould is stored horizontally in a water bath at 62° C., and the contents are polymerized. The main polymerization achieves about 90% conversion. The post-polymerization of the sheets takes place in an annealing oven at 120° C. After cooling of the sheets, the upper plate of glass of the cell is removed, and the semifinished product (poly(meth)acrylate sheet) is removed.

3. Production, by Way of Example, of a Self-Reinforced Poly(meth)acrylate Sheet 3.1. Production by Polymerizing the Mix of Example 2 onto the Sheet of Example 1

To construct the mould, a reinforcement sheet described in Example 1 is placed on a sheet of glass forming a lower side of the mould.

A mix described in 2.1. is then poured onto the reinforcement sheet. The amount to be poured on here depends on the desired thickness of the layer with lower filler content. The layers polymerized on preferably have dimensions of from 1 to 5 mm. The thickness of the layer polymerized on in Example 3.1 was 3.2 mm. The main and post-polymerization takes place as described above herein under 1.

3.2. Production by Polymerizing the Mix of Example 1 onto the Sheet of Example 2

To construct the mould, a sheet described in Example 2 is placed on one glass side of the mould. Mould construction continues as described under 1.

A mix described in 1.1. is then poured onto the reinforcement sheet. The thickness of the layer polymerized on in Example 3.2 was 5 mm. The main and post-polymerization takes place as described above herein under 1.

3.3. Production by Laminating a Sheet of Example 1 to a Sheet of Example 2

The vacuum process or prepreg process is used to laminate a sheet described in Example 2 to a sheet described in Example 1.

In the first case, a uniform subatmospheric pressure is generated by generating a vacuum across the entire component (sandwich of sheet as in 1 and 2, and also an adhesion promoter, where appropriate). Included air and excess adhesive resin are removed from the part to be laminated, and the resultant bond achieved between the two sheets is exceptionally good.

In the case of prepreg processing, the lamination takes place in an autoclave or under a press, using heat and introducing pressure.

3.4. Determination of Elongations at Break of the Sheets of Examples 1 and 2, and Also of the Laminate from Example 3.3.

Elongations at break were determined to the standards stated herein.

The layer with higher filler content (sheet of Example 1) had elongation at break of 144%.

The layer with lower filler content (sheet of Example 2) had elongation at break of 950%.

The laminate of the sheet of Ex. 1 and the sheet of Ex. 2 had elongation at break of 333%.

4. High-Performance Shaping of the Semifinished Sheet of 3.1

4.1. The semifinished product of 3.1. has a thickness of about 8.2 mm. A semifinished product of dimensions about 0.9×0.9 m is thermoformed to give a shower tray. This takes place as follows: the sheet to be shaped is secured in a metal frame. The upper and lower sides of the sheet are heated by infrared sources until the surface temperature has reached about 190° C. The infrared sources are then removed, and a mould is brought up to the lower side of the sheet to form an airtight seal against the sheet. The heated sheet is drawn into the mould by a vacuum. The shaped article can be removed after cooling.

The shower tray of the example fulfilled the requirements of the appropriate standards. In particular, the following tests were carried out by way of example on the shower tray of the example, and were passed:

1) Chemicals resistance to EN 249;
2) Temperature cycle resistance to EN 249;
3) Impact resistance to EN 249;
4) Deflection to EN 249 (required: 2 mm) achieved from 2 to 4 mm.

What is claimed is:

1. A self-reinforced, thermoplastically moldable sheet comprising poly(meth)acrylate, said sheet having at least two layers which differ in filler content, where the filler content is the percentage proportion by weight of one or more reinforcing fillers based on the total weight of the respective layer, wherein the ratio between the elongation at break of the layer with higher filler content and the elongation at break of the layer with lower filler content is less than 1.5, and wherein the sheet has at least two layers with differing filler content, each layer having a thickness of from 0.5 to 10 mm.

2. The moldable sheet according to claim 1, wherein the ratio between the elongation at break of the layer with higher filler content and the elongation at break of the layer with lower filler content is in the range from 0.8 to 0.1.

3. The moldable sheet according to claim 1, wherein the layer with lower filler content is free from reinforcing fillers.

4. The moldable sheet according to claim 1, wherein the ratio between the filler content of the layer with higher filler content and the filler content of the layer with lower filler content is more than 2.

5. The moldable sheet according to claim 1, wherein the reinforcing fillers comprise one or more fillers selected from the group consisting of talc, dolomite, mica, quartz, naturally occurring adhesions of talc and dolomite, chlorite, aluminium oxide, aluminium hydroxide, clays, silicon dioxide, silicates, carbonates, phosphates, sulphates, sulphides, metal oxides, powdered glass, glass beads, ceramics, kaolin, porcelain, crystobalite, feldspar, chalk, carbon and inert-gas-filled hollow microparticles.

6. The moldable sheet according to claim 1, wherein the reinforcing fillers have one or more of a globular, a spherical or a lamellar shape.

7. The moldable sheet according to claim 1, wherein the average particle size of the reinforcing filler is in the range from 0.01 to 80 μm.

8. The moldable sheet according to claim 1, wherein the thickness of the layer with lower filler content is in the range from 2 to 4 mm, and the thickness of the layer with higher filler content is in the range from 3 to 8 mm.

9. The moldable sheet according to claim 1, wherein the layer with lower filler content is obtained by polymerizing a (meth)acrylate system which comprises

| A) a) (meth)acrylate | 30–100% by wt. |
|---|---|
| a1) methyl (meth)acrylate | 0–99.99% by wt. |
| a2) $C_2$-$C_4$ (meth)acrylate | 0–99.99% by wt. |
| a3) ≧$C_5$ (meth)acrylate | 0–50% by wt. |
| a4) (meth)acrylates of functionality two or higher | 0.01–50% by wt. |
| a5) urethane (meth)acrylates | 0–50% by wt. |
| b) comonomers | 0–70% by wt. |
| b1) vinylaromatics | 0–35% by wt. |
| b2) vinyl esters | 0–35% by wt. | where the components a1) to a5) are from 30 to 100% by weight of a), and the components b1) to b2) are from 0 to 70% by weight of b), and a) and b) are 100 percent by weight of component A), B) for each part by weight of A), 0–12 parts by weight of a (pre)polymer soluble or swellable in A), C) initiator, in an amount sufficient to cure component A), D) optionally, a means of adjusting the viscosity of the system, E) for each part by weight of A) an amount of up to 3 parts by weight of conventional additives and F) for each part by weight of binder, binder based on the total weight of components A) through E), less than 0.25 part by weight of reinforcing fillers.

10. The moldable sheet according to claim 1, wherein the layer with high filler content is obtained by polymerizing a (meth)acrylate system which comprises

| A) a) (meth)acrylate | 50–100% by wt. |
|---|---|
| a1) methyl(meth)acrylate | 0–99.99% by wt. |
| a2) $C_2$-$C_4$ (meth)acrylate | 0–99.99% by wt. |
| a3) ≧$C_5$ (meth)acrylate | 0–50% by wt. |
| a4) (meth)acrylates of functionality two or higher | 0.01–50% by wt. |
| a5) urethane (meth)acrylates | 0–50% by wt. |
| b) comonomers | 0–50% by wt. |
| b1) vinylaromatics | 0–50% by wt. |
| b2) vinyl esters | 0–50% by wt. | where the components a) and b) are 100 percent by weight of the polymerizable component A), B) for each part by weight of A), 0–12 parts by weight of a (pre)polymer soluble or swellable in A), C) initiator, in an amount sufficient to cure component A), D) optionally, a means of adjusting the viscosity of the system, E) for each part by weight of A) an amount of up to 3 parts by weight of conventional additives and F) for each part by weight of binder, binder based on the total weight of components A) through E), from 0.25 to 4 parts by weight of reinforcing fillers.

11. A process for producing the moldable sheet according to claim 1, comprising
coextruding the layer with lower filler content and the layer with higher filler content.

12. The process according to claim 1, wherein the layer with lower filler content is polymerized onto the layer with higher filler content, or the layer with higher filler content is polymerized onto the layer with lower filler content.

13. The process according to claim 1, wherein the layer with higher filler content is a sheet which, in a cell-casting process, is laid onto a lower side of a glass-sheet mold, and, a (meth)acrylate system is then poured into the cell, onto the inserted sheet with higher filler content, and polymerized by cell-casting, to obtain a layer with a lower filler content.

14. The process according to claim 1, wherein at least one layer, optionally obtained by extrusion and having higher filler content, is bonded to a layer having lower filler content.

15. The process according to claim 14, wherein the layers are laminated to one another.

16. The process according to claim 14, wherein the layer with lower filler content is bonded to the layer with higher filler content by heat-generated fusion.

17. A sanitary item produced from a self-reinforced, thermoplastically moldable sheet according to claim 1.

18. The sanitary item according to claim 17, wherein the sanitary item is a bathtub, shower tray or washbasin.

19. A process for producing a sanitary item from a self-reinforced, thermoplastically moldable sheet, comprising
molding a sheet according to claim 1 with heat and pressure.

20. The sheet claimed in claim 1, wherein the ratio between the elongation at break of the layer with higher filler content and the elongation at break of the layer with lower filler content is in the range from 0.6 to 0.1.

21. The sheet claimed in claim 1, wherein the ratio between the filler content of the layer with higher filler content and the filler content of the layer with lower filler content is more than 4.

22. The sheet claimed in claim 1, wherein the ratio between the filler content of the layer with higher filler content and the filler content of the layer with lower filler content is more than 16.

23. The sheet claimed in claim 1, wherein the average particle size of the reinforcing filler is in the range from 0.05 to 30 μm.

24. The sheet claimed in claim 1, wherein the sheet has two layers with differing filler content and the thickness of each layer is from 1.5 to 7 mm.

25. The sheet claimed in claim 1, wherein the thickness of the layer with lower filler content is from 2 to 4 mm and the thickness of the layer with the higher filler content is from 4 to 6 mm.

26. The sheet claimed in claim 1, wherein the thickness of the layer with the lower filler content is from 2.5 to 3.5 mm and the thickness of the layer with the higher filler content is from 3 to 8 mm.

27. The process as claimed in claim 15, wherein the layers are laminated to one another with an adhesive.

28. The process as claimed in claim 19, wherein the sanitary item is a bathtub, shower tray or wash basin.

29. The process as claimed in claim 19, wherein theسheet is molded by thermoforming.

* * * * *